UNITED STATES PATENT OFFICE.

CARL FRIEDERICH MARIA SCHAERGES AND PAUL SCHWARZ, OF BASLE, SWITZERLAND, ASSIGNORS TO F. HOFFMANN-LA ROCHE & CO., OF SAME PLACE.

ACETYL DERIVATIVE OF PHENETIDIN.

SPECIFICATION forming part of Letters Patent No. 602,690, dated April 19, 1898.

Application filed October 19, 1897. Serial No. 655,741. (Specimens.) Patented in England June 14, 1897, No. 14,397.

*To all whom it may concern:*

Be it known that we, CARL FRIEDERICH MARIA SCHAERGES, doctor of philosophy and chemist, a subject of the King of Bavaria, and PAUL SCHWARZ, doctor of philosophy and chemist, a subject of the King of Prussia, Emperor of Germany, residing in Basle, Switzerland, have invented new and useful Improvements in the Manufacture of Pharmaceutical Products, (which have been patented in Great Britain, No. 14,397, dated June 14, 1897,) of which the following is a clear and complete specification.

We have discovered that in treating phenetidin with concentrated sulfuric acid phenetidin-sulfonic acid is produced. This compound can be directly employed in medicine for the treatment of various diseases and can also, after conversion into its metallic salts, be employed as initial product for the production of acetyl derivatives, which can be employed in medicine as antipyretic substances soluble in water.

I. *Manufacture of phenetidin-sulfonic acid and its salts.*—The following method will serve as an example: Phenetidin is slowly introduced into from two to three times its weight of concentrated sulfuric acid containing ten per cent. anhydrid, a considerable rise of temperature ensues, and the phenetidin sulfate, which at first separates, is gradually dissolved again. The heat generated by this reaction is sufficient to partially form phenetidin-sulfonic acid, but the sulfonation is only completed on heating for a length of time to from 100° to 120° centigrade or for a shorter time to a higher temperature. In either case the mass becomes suddenly solid by the separation of the acid produced. In the reaction product no phenetidin can be found by by means of soda-lye. The product is mixed with water and washed therewith. For its further purification the phenetidin-sulfonic acid is converted into a salt, such as a sodium salt, from which it is again separated by acid.

Phenetidin-sulfonic acid is a crystalline body which is white when pure. It is soluble with great difficulty in cold water and alcohol and not at all in ether. For the production of the salts the acid is either saturated directly with the base or it is converted by double decomposition. The salts, which are mostly unstable, colored, and readily soluble in water, can be obtained in a very pure condition by precipitation from their aqueous solution by means of alcohol.

For the preparation of the sodium salt more especially the solid acid, for instance, is saturated with soda-lye or a solution of carbonate of soda, and the salt is precipitated by means of alcohol or other precipitant acting in a similar manner.

II. *Production of the acetyl derivatives.*—The following serve as an example: Equal parts of sodium phenetidin sulfonate and of glacial acetic acid, to which a quantity of acetic anhydrid has been added, are heated to boiling-point for several hours in a reflux apparatus. The excess of acetic acid present is then separated as much as possible by distillation, and the reaction product is dissolved in a small quantity of water, is then filtered and precipitated by strong alcohol, or the aqueous solution can be precipitated by means of a mixture of ether and alcohol, but in the latter case the product will have to be purified by boiling with strong alcohol. The alcohol will dissolve any sodium acetate that may be present. The final product consists of a reddish-white microcrystalline hygroscopic body which is easily soluble in water, less easily in alcohol, and insoluble in ether. The phenetidin-sulfonic acid is only separated on boiling with mineral acids, acetic acid being generated.

The employment of the sodium acetyl phenetidin sulfonate as an antipyretic agent shows as compared with phenacetin the advantage that it is soluble in water and therefore of more rapid action. For an adult the dose may be from one-half to one gram, and not more than three grams should be administered in one day. For an infant under two years of age the dose should be about one-fifth of a gram, and not more than half a gram, as a maximum, should be given in one day. In a similar manner the acetyl derivations of the other metallic salts of phenetidin-sulfonic acid can be prepared.

What we claim is—

1. The process of preparing pharmaceutical products consisting in the preparation of phenetidin-sulfonic acid by treating phenetidin with concentrated sulfuric acid, as described.

2. The process of preparing pharmaceutical products consisting in the preparation of an acetyl derivative of a salt of phenetidin-sulfonic acid, by treating phenetidin with concentrated sulfuric acid, converting the phenetidin-sulfonic acid thus obtained into a salt and acetylizing this salt (phenetidin sulfonate) by means of glacial acetic acid and acetic anhydrid, as described.

3. As a new article of manufacture, the herein-described acetyl derivative of an alkaline phenetidin sulfonate, which consists of a reddish-white microcrystalline, hygroscopic body, which is easily soluble in water, less easily soluble in alcohol and insoluble in ether and has antipyretic properties.

In witness whereof we have hereunto signed our names in the presence of two subscribing witnesses.

CARL FRIEDERICH MARIA SCHAERGES.
PAUL SCHWARZ.

Witnesses:
GEORGE GIFFORD,
AMAND RITTER.